United States Patent Office 3,430,656
Patented Mar. 4, 1969

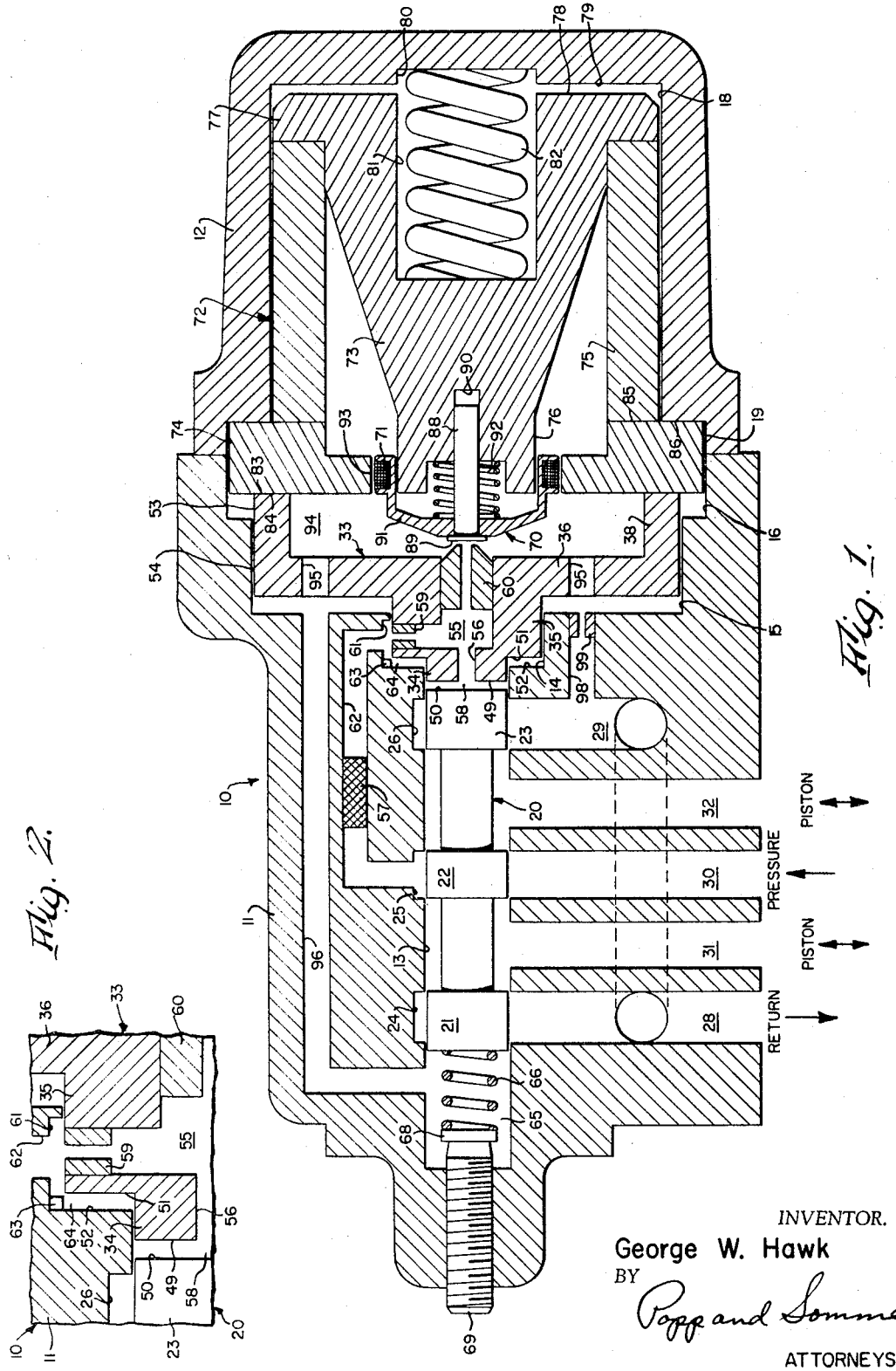

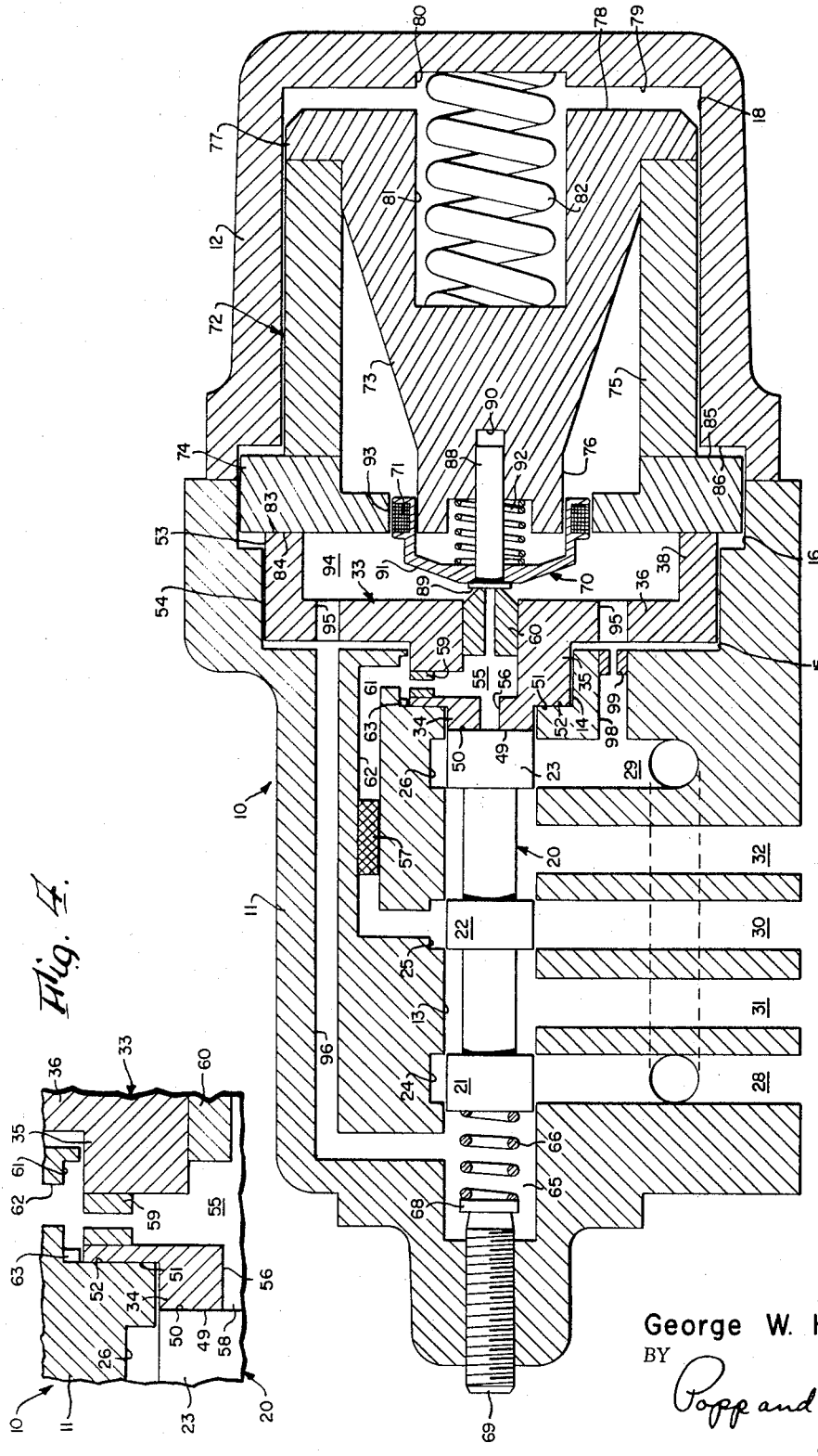

3,430,656
POSITIVE CENTERING SERVOVALVE HAVING MOVABLE NOZZLE BLOCK
George W. Hawk, East Aurora, N.Y., assignor to Moog Inc., East Aurora, N.Y., a corporation of New York
Filed Apr. 7, 1967, Ser. No. 629,134
U.S. Cl. 137—625.61                                7 Claims
Int. Cl. F15c 3/02

ABSTRACT OF THE DISCLOSURE

A servovalve having a valve slide the position of which is normally obtained by a balance of a spring force and a fluid force due to pressure in a chamber at one end of the slide but maintained in a null position when there is no signal input and fluid supply pressure is below a predetermined minimum operating level, this being achieved by moving a nozzle block which defines the outer end wall of said chamber abuttingly against said one end of the slide which defines the inner end wall of said chamber.

Background of the invention

This invention relates to improvements in a servovalve of that type which has a valve slide spring biased to move in one direction to reduce the volume of an end chamber at one end of the slide, the fluid pressure in such end chamber being controlled by a variable orifice produced by the spacing between a movable reaction member and a nozzle for discharging fluid. This reaction member is suitably preloaded toward the nozzle tip. Normally, the effective area of the variable orifice is responsive to a signal input to the reaction member and thus a control pressure is developed in the end chamber and applied to move the slide until the spring and fluid pressure forces balance.

When such a servovalve is pressurized with hydraulic fluid, the slide end chamber is pressurized through an inlet orifice with which the nozzle also communicates. This chamber pressure will be equal to supply pressure until the pressure force acting on the nozzle area is equal to the preload force on the reaction member. As system pressure is increased above this level, the reaction member will displace relative to the nozzle and maintain a constant chamber pressure irrespective of system pressure, provided there is no signal input to the reaction member. When there is a signal input, however, the oppositely directed spring and pressure forces on the slide determine its position relative to pressure and return ports with which control elements on the slide are operatively associated to control the flow of fluid through actuating ports leading to an actuator to be fluidly driven. The result is a slide motion and therefore output flow, proportional to input signal to the reaction member.

It will be seen that when system pressure is building up from zero to that level which will displace the reaction member, as occurs during a start-up condition, and also when system pressure is falling from said level toward zero, as occurs during a close-down condition, the spring force will displace the slide hardover since insufficient pressure force is available to counterbalance the spring force.

Summary of the invention

The present invention provides a servovalve of the aforementioned type but constructed so that its valve slide will not be displaced or go hardover when system pressure is below a predetermined minimum operating level and there is no signal input to the servovalve. This is achieved according to the present invention by providing a movable nozzle block at one end of the valve slide adapted to engage the same, biasing the block toward the slide, applying fluid supply pressure between the block and slide, and limiting the extent to which the block can move away from the slide.

Brief description of the drawings

FIG. 1 is a diagrammatic longitudinal sectional view of an improved servovalve embodying the present invention, and showing the condition of such servovalve when system pressure is above a predetermined minimum operating level.

FIG. 2 is a fragmentary enlarged viewing of a portion of the servovalve shown in FIG. 1.

FIG. 3 is a view similar to FIG. 1 but illustrating the condition of the servovalve when system pressure is below such predetermined level.

FIG. 4 is a fragmentary enlarged view of a portion of the servovalve shown in FIG. 3.

Description of the preferred embodiment

The improved servovalve of the present invention is shown as comprising a body indicated generally at 10 including a main section 11 and a removable cup-shaped head section 12. Body section 11 has a cylindrical bore 13 the end of which adjacent head section 12 is counterbored in three enlarging steps as indicated at 14, 15 and 16. Head section 12 has a cylindrical recess 18 coaxial with bore 10 and enlarged at its end adjacent main body section 11 as indicated at 19, to a diameter corresponding to that of counterbore step 16.

Bore 13 serves as a slideway for a valve slide represented generally by the numeral 20 which is shown as a spool including a left end cylindrical lobe 21, a center cylindrical lobe 22 and a right end cylindrical lobe 23. When this valve spool is in a null or no signal input position as shown, left lobe 21 closes a left annular return port 24, center lobe 22 closes an annular pressure port 25, and right lobe closes a right annular return port 26, these ports being provided in body section 11. A main return passage 28 leads from left port 24 to the base of body section 11. A branch return passage 29 communicatively connects right port 26 with passage 28. A main supply or pressure passage 30 leads from center port 25 to the base of body section 11. This body section also has a first actuating port passage 31 leading from the portion of bore 13 between lobes 21 and 22 to the base of this body section. A similar second actuating port passage 32 leads from the portion of bore 13 between lobes 22 and 23 to the base of body section 11. These passages 31 and 32 are intended for connection to an actuator (not shown).

The numeral 33 represents generally a nozzle block. In accordance with the present invention and for a purpose explained infra, this nozzle block is movable coaxially relative to valve spool 20 and body section 11. To this end, nozzle block 33 is shown as having a cylindrical end plug portion 34, a cylindrical piston portion 35, a radially extending annular flange portion 36 and a cylindrical flange portion 38 extending axially from the rim of this radial flange portion toward head section 12. End plug portion is slidably but sealingly arranged in the end of bore 13 and has an end face 49 which opposes and is adapted to abuttingly engage end face 50 of spool 20 under certain circumstances as explained infra. Piston portion 35 is slidably arranged in counterbore step 14 and has an end face 51 which opposes and is adapted to abuttingly engage radial end wall 52 on body section 11 between bore steps 13 and 14 under certain circumstances as explained infra. Flange portion 36 is arranged in the space provided by counterbore step 15 and the cylindrical periphery 53 of axial flange portion 38 has a slight radial clearance with opposing counterbore step surface 15 as indicated at 54 in order to allow fluid to flow axially back and forth through this clearance.

Nozzle block 33 is shown as having an internal chamber 55 communicating via passage 56 with the space between end faces 49 and 50 when they are separated to form a right spool end chamber 58 as shown in FIG. 1. Chamber 55 has a radial inlet passage in which a flow restrictor member 59 is arranged, and an axial outlet passage in which a flow nozzle member 60 is arranged. The upstream end of the bore of restrictor 59 is shown as communicating with a recessed port 61 communicatively connected via branch supply passage 62 with pressure port 25. A suitable filter 57 is shown arranged in passage 62. Port 61 is shown as axially extended to body end face 52 as indicated at 63, so as to be in communication constantly with the space 64 between body end wall 52 and block end face 51.

Body bore 13 extends beyond left lobe 21 to provide a left spool end chamber 65 in which a helical compression spring 66 is arranged. One end of this spring 66 bears against valve spool 20 and the other end bears against a seat 68 adjustable axially by a screw 69 threadedly mounted on the end of body section 11. Spring 66 biases valve spool 20 toward nozzle block 33. By turning screw 69 the preload of spring 66 can be adjusted and hence the null position of valve spool 20.

A reaction member indicated generally at 70 is positioned opposite the discharge end or tip of the nozzle member 60 so as to be impinged by fluid discharged therefrom and is movable with respect this nozzle member to provide a variable spacing therebetween and hence a variable orifice through which fluid is discharged. Means are provided for moving reaction member 70 relative to the nozzle tip in response to an input signal so as to vary the effective area of such orifice and thereby regulate the pressure in right spool end chamber 58 and hence the axial position of valve spool 20 relative to body section 11. While such means may be variously constructed so as to be responsive to an electrically, mechanically or gaseously operated device as desired, the preferred means shown comprises a movable coil 71 of an electromagnetic force motor means indicated generally at 72 which also includes an inner pole piece 73 of magnetic material, an outer pole piece 74 of magnetic material and a permanent magnet ring 75. Coil 71 is suitably carried by reaction member 70.

Inner pole piece 73 is a post-like member having a small end and a large end. The small end is provided by an external cylindrical surface portion 76 arranged concentrically with nozzle member 60. The large end of this inner pole piece has a radially extending annular flange portion 77 and a flat end face 78 which opposes in slightly spaced relation the inner end wall surface 79 of the cup-shaped head section 12. Centrally this end wall surface is shown as having a shallow recess 80 and the large end of the inner pole piece 73 is shown as provided with an opposing comparatively deeper recess 81. A helical compression spring 82 is shown as arranged in the combined recesses 80 and 81 and bearing at its opposite ends against the bottoms of these recesses.

Permanent magnet ring 75 at one end abuts against flange 77 of the inner pole piece 73 and at its opposite end abuts against outer pole piece 74. The cylindrical peripheries of flange 77 and magnet ring 75 are conterminous and closely but slidably fit the cylindrical wall of recess 18. The outer pole piece 74 is a ring member having a cylindrical periphery which closely but slidably fits the conterminous walls of counterbore 16 and 19. This outer pole piece is shown as having a flat radial end face 83 which abuttingly engages a flat radial end face 84 on flange portion 38 of nozzle block 33.

It will be seen that spring 82 through abutting elements 77, 75, 74 and 38 biases nozzle block 33 toward valve spool 20. The maximum movement of these elements in this leftward direction is limited by engagement of end face 51 on nozzle block 33 with end wall surface 52 on main body section 11, as depicted in FIG. 3. In the opposite or rightward direction the maximum movement of these elements 77, 75, 74 and 38 is limited by engagement of a flat radial surface 85 on outer pole piece 74 with an oppositely facing flat radial surface 86 on body head section 12 formed by the step between recess 18 and its counterbore 19.

Reaction member 70 is shown as comprising a headed pin 88 coaxially arranged with respect to nozzle member 60 and having an end face or target surface 89 impinged by fluid discharged by this nozzle member. The shank of pin 88 is shown as slidably arranged in a recess 90 provided in inner pole piece 73 and carries a bobbin 91 on which coil 71 is wound. A helical compression spring 92 is shown as surrounding pin 88 and arranged between this bobbin 91 and inner pole piece 73, fitting in a suitable recess provided therein, and serves to hold this bobbin against the shoulder on the head of this pin and also to bias or preload the reaction member 70 as a whole toward nozzle member 60. Coil 71 is supported in the annular air gap between cylindrical surface 76 on inner pole piece 73 and a surrounding and radially spaced concentric cylindrical surface 93 on outer pole piece 74.

The space unoccupied by the radial and axial flange portions 36 and 38, respectively, of nozzle block 33 provides a sump chamber 94 which receives fluid discharged by nozzle member 60. A series of circumferentially spaced holes 95 through the radial flange portion 36 of nozzle block 33 establish constant communication between left and right portions of chamber 94 on opposite sides of this flange portion 36.

A passage 96 in main body section 11 establishes constant communication between left spool end chamber 65 and sump chamber 94. This sump chamber 94 is drained by a drain passage 98 shown as communicatively connected to branch return passage 29 and having an anti-surge restrictor member 99 therein.

*Operation*

Assuming pressurized fluid such as hydraulic oil at a suitable normal operating pressure such as 1000 pounds per square inch (hereinafter referred to as p.s.i.) is applied to pressure passage 30, this pressure is also transferred via connected passage 62 and extended port 61, 63 to space 64 between body end wall 52 and nozzle block piston end face 51. When the fluid is at this normal operating pressure level, the pressure force against end face 51 is sufficient to overcome the oppositely directed spring force exerted by spring 82 acting through contacting elements 73, 75, 74 and 33. As a consequence, the various parts assume the condition depicted in FIG. 1 in which valve spool 20 is illustrated as being in a centered or null position with respect to ports 24–26.

It will be seen that when the pressure in space 64 is below a predetermined level, the pressure force exerted against nozzle block end face 51 is insufficient to overcome the spring force exerted by spring 82. When such a situation obtains, the various parts will assume the condition depicted in FIG. 3. From this FIG. 3, it will be seen that nozzle block piston end face 51 abuttingly engages body end wall 52.

It is a feature of the present invention that nozzle block plug end face 49 will engage valve spool end face 50, when surfaces 51 and 52 abut, in order to maintain valve spool 20 in null position, as depicted in FIG. 3. In this manner valve spool 20 will not move hardover to the right under the urging of spool end spring 66 when supply pressure is below a predetermined minimum operating level and there is no signal input to coil 71.

More specifically, consider supply pressure to be zero. The parts will be in the condition depicted in FIG. 3. As supply pressure increases but still below a predetermined minimum operating level, the supply pressure will be applied directly to spool end face 50 through inlet orifice 59, internal chamber 55 and passage 56, all in nozzle block 33, while surfaces 51 and 52 remain in abutting engagement as also do surfaces 49 and 50. During this time, reaction member 70 will be positioned under the urging of its preload spring 92 so that target surface 89 engages the tip of nozzle member 60 closing the bore thereof, as depicted in FIG. 3. It will thus be seen that the internal chamber 55 of nozzle block 33 is a closed chamber so that whatever pressure obtains in branch supply passage 62 also obtains in this chamber 55.

However, when supply pressure builds up to a predetermined minimum operaitng level, say about 500 p.s.i., this pressure effective against nozzle block piston end face 51 is adequate to move the nozzle block to the right so that this end face lifts off or moves away from body surface 52. At the same time, this pressure is applied through passage 56 in the nozzle block to spool end face 50, the retraction of nozzle block plug end face 49 permitting of this and establishes spool end chamber 58. Thereafter as supply pressure continues to increase up to the normal operating level which may vary with applications, here assumed to be 1000 p.s.i., this pressure is effective to assure separation of surfaces 51 and 52 and also of surfaces 49 and 50. The increase of supply pressure above the assumed 500 p.s.i. minimum operating level causes a pressure force acting over the nozzle area on target surface 89 of retraction member 70 to exceed the preload force on this reaction member due to spring 92. Thus the reaction member is displaced away from nozzle member 60 and will maintain a constant pressure in chamber 55, irrespective of system pressure. Spool end spring 66 is selected to have a spring rate such that through adjustment of screw 69 the preload on valve spool 20 will maintain this spool in a null position when surfaces 49 and 50 are separated and assuming no signal input to coil 71.

As is well known to those skilled in the art, when a signal is impressed on coil 71 of a certain sign and magnitude, it will react with the flux in the air gap between pole pieces 73 and 74 to move reaction member 70 relative to nozzle tip 60 and thereby vary the pressure in nozzle block internal chamber 55 and hence also in right spool end chamber 58. Accordingly the spool 20 will shift relative to its ports 24–26 until a force balance is obtained between the pressure force in right spool end chamber 58 and the spring force exerted by left spool end spring 66.

The condition usually encountered when the supply pressure is below a predetermined minimum operating level is during start-up or close-down of the hydraulic pressurizing means such as a pump (not shown).

From the foregoing, it will be seen that the present invention provides an improved servovalve which maintains the valve spool in a null position when the supply pressure is below a predetermined minimum operating level and there is no signal input to the servovalve, and therefore avoids a hardover condition of the valve spool.

Since variations or changes in construction may occur to those skilled in the art without departing from the spirit of the present invention such as providing a shape of valve slide other than a cylindrical valve spool or providing a bushing in the body to receive the valve spool, the embodiment shown and described is illustrative and not limitative of the invention which is to be measured by the scope of the appended claims.

I claim:
1. In a servovalve including a body having a slideway, a valve slide movably arranged in said slideway, a nozzle block at one end of said slide, means biasing said slide toward said block, and passage means in said body for supplying pressurized fluid to said block, the improvement which comprises means mounting said block on said body for movement axially of said slide, means applying the pressure of fluid in said passage means against said block to urge the same to move away from said slide, means limiting movement of said block away from said slide, and means biasing said block toward said slide, said block being adapted to engage said slide, movement of said block toward said slide being limited by engagement of said block with said body.

2. A servovalve according to claim 1 wherein said block, when limited in its movement toward said slide by said engagement with said body, positions said slide in a predetermined position.

3. A servovalve according to claim 2 wherein said body is formed to provide a cylinder having an end wall, said block has a piston portion slidably arranged in said cylinder with its end face opposite said end wall, and said pressure applying means includes means establishing communication between said passage means and the space between said end wall and end face, engagement of said end face with said end wall limiting movement of said block toward said slide.

4. A servovalve according to claim 2 wherein said means biasing said block toward said slide includes motor means movably arranged on said body and engaging said block and spring means interposed between said motor means and body.

5. A servovalve according to claim 4 wherein said motor means includes an inner pole piece, an outer pole piece and a permanent magnet ring arranged between said pole pieces, said outer pole piece engaging said block, and said spring means engaging said inner pole piece.

6. A servovalve according to claim 5 wherein said means limiting movement of said block away from said slide includes a stop surface on said body engageable by said outer pole piece.

7. A servovalve according to claim 2 wherein said predetermined position is the null position of said slide.

References Cited

UNITED STATES PATENTS 2,625,136   1/1953   Moog _____ 137—625.61

HENRY T. KLINKSIEK, *Primary Examiner.*

U.S. Cl. X.R.

91—417; 251—141